United States Patent
Schmeisser et al.

(10) Patent No.: US 11,380,916 B2
(45) Date of Patent: Jul. 5, 2022

(54) FUEL CELL AND FUEL CELL STACK

(71) Applicant: Robert Bosch GmbH, Stuttgart (DE)

(72) Inventors: Harald Schmeisser, Stuttgart (DE); Werner Belschner, Michelbach An der Bilz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/964,297

(22) PCT Filed: Jan. 16, 2019

(86) PCT No.: PCT/EP2019/051012
§ 371 (c)(1),
(2) Date: Jul. 23, 2020

(87) PCT Pub. No.: WO2019/145197
PCT Pub. Date: Aug. 1, 2019

(65) Prior Publication Data
US 2021/0036348 A1 Feb. 4, 2021

(30) Foreign Application Priority Data
Jan. 24, 2018 (DE) ...................... 10 2018 201 056.0

(51) Int. Cl.
*H01M 8/04223* (2016.01)
*H01M 8/0271* (2016.01)
*H01M 8/1004* (2016.01)

(52) U.S. Cl.
CPC ..... *H01M 8/04238* (2013.01); *H01M 8/0271* (2013.01); *H01M 8/1004* (2013.01)

(58) Field of Classification Search
CPC ................................................ H01M 8/04238
See application file for complete search history.

(56) References Cited

U.S. PATENT DOCUMENTS

| 2,634,352 A | * | 4/1953 | Boykin | ..................... | H01C 3/02 |
| | | | | | 338/62 |
| 2002/0076592 A1 | * | 6/2002 | Sato | ..................... | H01M 8/2483 |
| | | | | | 429/442 |

(Continued)

FOREIGN PATENT DOCUMENTS

DE 102008011306 9/2008

OTHER PUBLICATIONS

Definitions (Year: 2022).*

(Continued)

*Primary Examiner* — Brian R Ohara
(74) *Attorney, Agent, or Firm* — Michael Best & Friedrich LLP

(57) ABSTRACT

The invention relates to a fuel cell (2) comprising at least one membrane/electrode unit (10) comprising a first electrode and a second electrode, which electrodes are separated from one another by a membrane, and comprising at least one polar plate (40) which comprises a first distribution region (50) for distributing a fuel to the first electrode and a second distribution region (60) for distributing an oxidation agent to the second electrode. The first electrode and the second electrode of the at least one membrane electrode unit (10) are electrically connected by means of a conductor (90). The invention also relates to a fuel cell stack (5) which comprises a plurality of the claimed fuel cells (2).

10 Claims, 6 Drawing Sheets

(56) References Cited

U.S. PATENT DOCUMENTS

| | | | |
|---|---|---|---|
| 2004/0081866 A1* | 4/2004 | Bekkedahl | H01M 8/04238 |
| | | | 429/429 |
| 2006/0199061 A1* | 9/2006 | Fiebig | H01M 8/04291 |
| | | | 429/534 |
| 2012/0214077 A1 | 8/2012 | Garrettson et al. | |

OTHER PUBLICATIONS

International Search Report for Application No. PCT/EP2019/051012 dated Apr. 25, 2019 (English Translation, 2 pages).

* cited by examiner

FUEL CELL AND FUEL CELL STACK

BACKGROUND

The invention relates to a fuel cell comprising at least one membrane/electrode unit, which has a first electrode and a second electrode separated from one another by a membrane, and comprising at least one polar plate. The polar plate of the fuel cell comprises a first distribution region for distributing a fuel to the first electrode, and a second distribution region for distributing an oxidizing agent to the second electrode. The invention also relates to a fuel cell stack comprising a plurality of fuel cells according to the invention.

A fuel cell is a galvanic cell that converts the chemical energy from a reaction between a continuously supplied fuel and an oxidizing agent into electrical energy. A fuel cell is therefore an electrochemical energy converter. Known fuel cells involve in particular the conversion of hydrogen (H2) and oxygen (O2) into water (H2O), electrical energy and heat.

Known fuel cells include proton exchange membrane (PEM) fuel cells. Proton exchange membrane fuel cells comprise a centrally arranged membrane through which can pass protons, i.e. hydrogen ions. The oxidizing agent, in particular atmospheric oxygen, is thereby spatially separated from the fuel, in particular hydrogen.

In addition, proton exchange membrane fuel cells comprise an electrode designated an anode, and an electrode designated a cathode. The fuel is supplied to the anode of the fuel cell and is catalytically oxidized into protons with the release of electrons. The protons reach the cathode through the membrane. The released electrons are conducted out of the fuel cell and flow via an external circuit to the cathode, or via an adjacent bipolar plate to the cathode of the adjacent fuel cell. The oxidizing agent is supplied to the cathode of the fuel cell and it reacts to form water by taking up the electrons from the external circuit or the adjacent fuel cell, and protons that have reached the cathode through the membrane. The water produced in this way is ducted out of the fuel cell. The overall reaction is given by:

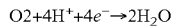

$$O2+4H^{+}+4e^{-} \rightarrow 2H_2O$$

Bipolar plates are provided for the purpose of evenly distributing the fuel to the anode and of evenly distributing the oxidizing agent to the cathode. The bipolar plates comprise, for example, channel-like structures for distributing the fuel and the oxidizing agent to the electrodes. The channel-like structures are also used for ducting away the water produced in the reaction. The bipolar plates can also comprise structures for ducting a coolant through the fuel cell for the purpose of heat dissipation.

A voltage lies between the anode and the cathode of the fuel cell. In order to increase the voltage, a plurality of fuel cells can be arranged mechanically one after the other into a fuel cell stack and connected electrically in series. The voltage between the anode and the cathode of the fuel cell under open circuit, i.e. without an electrical load, is a maximum and is called the open-circuit voltage. The voltage drops as the load increases, or in other words as the current increases.

If the fuel cell is operated at a high-voltage close to the open-circuit voltage, then this can lead to damage, in particular to irreversible degradation, of the fuel cell. This operating situation can arise, for instance, during shutdown of the fuel cell and in the event of load shedding. Operating the fuel cell at a high-voltage close to the open-circuit voltage and thus above the damage threshold value should therefore be avoided.

SUMMARY OF THE INVENTION

A fuel cell is proposed comprising at least one membrane/electrode unit, which has a first electrode and a second electrode separated from one another by a membrane, and comprising at least one polar plate. In particular, the fuel cell is designed such that a polar plate is attached at each end of the membrane/electrode unit.

The polar plate is embodied as a bipolar plate, for example, and comprises a first distribution region for distributing a fuel to the first electrode, and a second distribution region for distributing an oxidizing agent to the second electrode. In a fuel cell stack, a bipolar plate is arranged between each pair of adjacent fuel cells.

The polar plate may also be embodied as a monopolar plate, for example, and comprise a first distribution region for distributing a fuel to the first electrode or a second distribution region for distributing an oxidizing agent to the second electrode. In a fuel cell stack, a monopolar plate is arranged at each edge, i.e. on each of the outer fuel cells.

According to the invention, the first electrode and the second electrode of the at least one membrane/electrode unit are electrically connected by means of a conductor. The conductor is a member that is electrically conductive. Thus the conductor makes an electrical connection between the first electrode and the second electrode of the at least one membrane/electrode unit, via which connection a current can flow when a voltage lies between the first electrode and the second electrode. Said conductor is part of the fuel cell and during operation is continuously electrically connected to the two electrodes of the at least one membrane/electrode unit. In particular, the conductor remains connected to the electrodes even during shutdown of the fuel cell and in the event of load shedding.

The conductor is dimensioned such that the current flowing through the conductor discharges the fuel cell in a relatively short time, for instance in 10 seconds, in such a way that a voltage lying between the first electrode and the second electrode drops below a threshold value. The threshold value equals 0.85 V per fuel cell, for example.

In addition, the conductor is dimensioned such that thermal losses caused by the current flowing through the conductor are relatively small and result in only a marginal reduction in the efficiency of the fuel cell. In particular, the current flowing through the conductor equals at most 3% of the rated current of the fuel cell, preferably at most 0.5% of the rated current of the fuel cell.

According to an advantageous embodiment of the invention, the conductor comprises an ohmic resistor. Thus a current flowing through the conductor is proportional to a voltage lying between the first electrode and the second electrode.

According to another advantageous embodiment of the invention, the conductor comprises a semiconductor member. Thus a current flowing through the conductor is again dependent on a voltage lying between the first electrode and the second electrode. Said dependency is not necessarily proportional, however.

The semiconductor member may be, for example, a diode, in particular a Zener diode, or a transistor. The semiconductor member is preferably designed such that the semiconductor member does not conduct, or poorly conducts, electricity for an applied voltage that is less than the threshold value, and such that the semiconductor member conducts electricity well in the case of an applied voltage that is greater than the threshold value. In this case, the current for discharging the fuel cell flows through the conductor only, or only to a significant degree, when the voltage is greater than the threshold value. During normal operation of the fuel cell, the voltage is less than the limit value, and no current, or only a small current, flows through the conductor.

The conductor can also comprise a combination of a plurality of members, for instance a series or parallel connection of an ohmic resistor and a semiconductor member.

According to one possible embodiment of the invention, the conductor is embodied as a discrete component or else in the form of a plurality of discrete components.

According to another possible embodiment of the invention, the conductor is embodied as a reinforcing member, which is arranged at an edge region of the at least one membrane/electrode unit. For example, the reinforcing member is embodied in the form of two connected planar, in particular foil-like, members, and holds the first electrode, the membrane and the second electrode together mechanically or acts as reinforcement thereof in the edge region. In particular, edge reinforcement that is typically used in PEM fuel cells, which is also referred to as a "sub gasket", can be implemented as the conductor.

According to another possible embodiment of the invention, the conductor is embodied as a sealing member, which seals an edge region of the at least one membrane/electrode unit against at least one polar plate.

The conductor can also be embodied as an adhesive. In particular, the adhesive is used to adhesively bond a reinforcing member and/or a sealing member to the polar plate and to the membrane/electrode unit of the fuel cell.

According to another possible embodiment of the invention, the conductor is embodied as a potting compound, which encloses an edge region of the at least one membrane/electrode unit and an end face of the at least one polar plate.

According to another possible embodiment of the invention, the conductor has a foil-like, or strip-shaped, or wire-shaped, or foam-like design, and is in contact with at least one end face of the at least one polar plate. Preferably, the foil-like, or strip-shaped, or wire-shaped, or foam-like conductor is applied, in particular adhesively bonded, onto the end faces of a plurality of polar plates.

According to another possible embodiment of the invention, the conductor is simultaneously part of a cell-voltage measuring device, in particular a part of the voltage taps or the holders therefor that connects the individual measuring inputs of a cell-voltage measuring device to the respective polar plates or membrane/electrode units, for instance because they, or parts thereof, are made from suitably conductive materials, or coated, printed or pasted over by such materials or connected in another manner to such materials.

The conductor may also be printed onto an end face of the at least one polar plate. The conductor is preferably printed onto the end faces of a plurality of polar plates, in particular by means of 3D printing.

A fuel cell stack is proposed that comprises a plurality of fuel cells according to the invention. Said fuel cells are preferably electrically connected in series.

Advantages of the Invention

A fuel cell according to the invention is designed such that operating the fuel cell at a high voltage close to the open-circuit voltage is largely avoided. When the fuel cell is open-circuit, i.e. in the absence of electrical load, the fuel cell is discharged relatively quickly. The fuel cell is operated only for a short time at a voltage above the threshold value. Irreversible degradation of the fuel cell is thereby advantageously largely prevented. In a fuel cell stack comprising a plurality of fuel cells that are electrically connected in series, all the fuel cells are discharged simultaneously. In particular, a negative voltage across the fuel cell is also avoided, which likewise could cause irreversible degradation of the fuel cell. The structural design of a fuel cell according to the invention is also relatively simple and hence inexpensive. In addition, thermal losses during operation of the fuel cell according to the invention are advantageously minimized, in particular when the conductor comprises a suitable semiconductor member.

BRIEF DESCRIPTION OF THE DRAWINGS

Embodiments of the invention are described in greater detail with reference to the following description and the drawings,
in which.

DETAILED DESCRIPTION

In the following description of the embodiments of the invention, identical or similar items are denoted by the same reference signs, and a description of these items is not repeated in some cases. The figures provide only a schematic representation of the subject matter of the invention.

Figure 1:
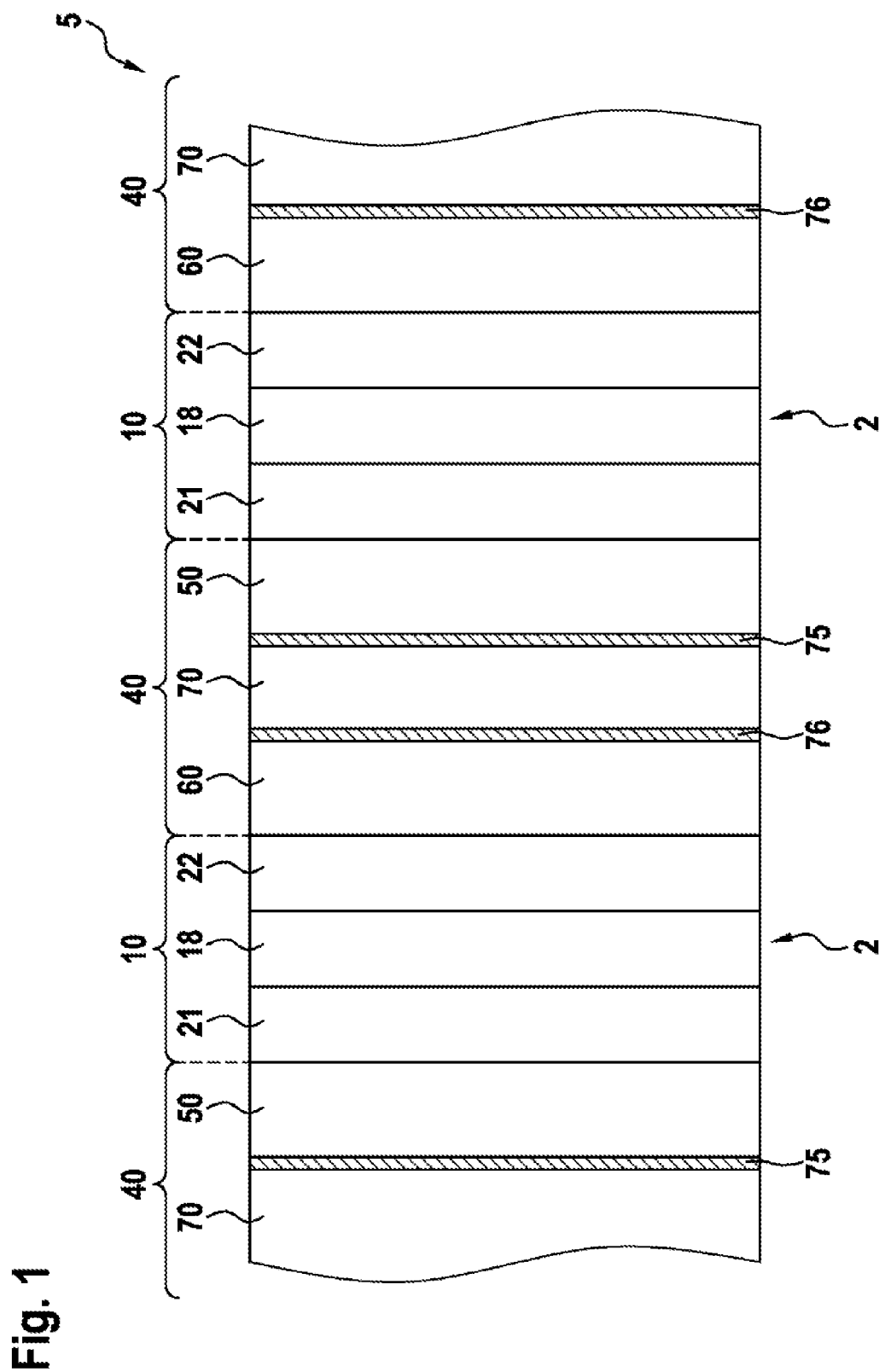
FIG. 1 shows a schematic diagram of a fuel cell stack having a plurality of fuel cells.

FIG. 1 shows a schematic diagram of a fuel cell stack 5 having a plurality of fuel cells 2. Each fuel cell 2 comprises a membrane/electrode unit 10, which comprises a first electrode 21, a second electrode 22 and a membrane 18. The two electrodes 21, 22 are arranged on opposite sides of the membrane 18 and hence separated from one another by the membrane 18. The first electrode 21 is also referred to below as an anode 21, and the second electrode 22 is also referred to below as a cathode 22. The membrane 18 is embodied as a polymer-electrolyte membrane. Hydrogen ions, i.e. $H^+$ ions, are able to pass through the membrane 18.

Each fuel cell 2 also comprises two polar plates 40, which in the diagram shown here are embodied as bipolar plates 40 and are in contact with the membrane/electrode unit 10 on both sides. In the arrangement shown here of a plurality of fuel cells 2 in the fuel cell stack 5, each of the bipolar plates 40 can be considered as belonging to two mutually adjacent fuel cells 2. The fuel cells 2 are electrically connected in series.

The bipolar plates 40 each comprise a first distribution region 50 for distributing a fuel, which region faces the anode 21. The bipolar plates 40 each comprise also a second distribution region 60 for distributing the oxidizing agent, which region faces the cathode 22. The second distribution region 60 serves at the same time to remove water produced during a reaction in the fuel cell 2. In the present case, the bipolar plates 40 comprise a third distribution region 70, which is arranged between the first distribution region 50 and the second distribution region 60. The third distribution region 70 serves to duct a coolant through the bipolar plate 40 and thereby to cool the fuel cell 2 and also the fuel cell stack 5.

The first distribution region 50 and the third distribution region 70 are separated from each other by a first separating plate 75. The second distribution region 60 and the third distribution region 70 are separated from each other by a second separating plate 76. The separating plates 75, 76 of the bipolar plates 40 are embodied as thin metal sheets in the present case. The separating plates 75, 76 may also be made from a different material, for instance carbon or graphite. The bipolar plates 40, and in particular the separating plates 75, 76, are designed to be electrically conductive.

During operation of the fuel cell 2, the fuel is ducted via the first distribution region 50 to the anode 21. Likewise, the oxidizing agent is ducted via the second distribution region 60 to the cathode 22. The fuel, hydrogen in the present case, is catalytically oxidized at the anode 21 into protons with the release of electrons. The protons reach the cathode 22 through the membrane 18. The released electrons are conducted out of the fuel cell 2 and flow via an external circuit or via the adjacent bipolar plate 40 to the cathode 22. The oxidizing agent, oxygen in the present case, reacts to form water by taking up the electrons from the external circuit or the adjacent bipolar plate 40, and protons that have reached the cathode 22 through the membrane 18.

A voltage is thereby generated between the anode 21 and the cathode 22 of each membrane/electrode unit 10. As a result of the serial interconnection of the fuel cells 2, these voltages add to produce an overall voltage of the fuel cell stack 5.

Figure 2:
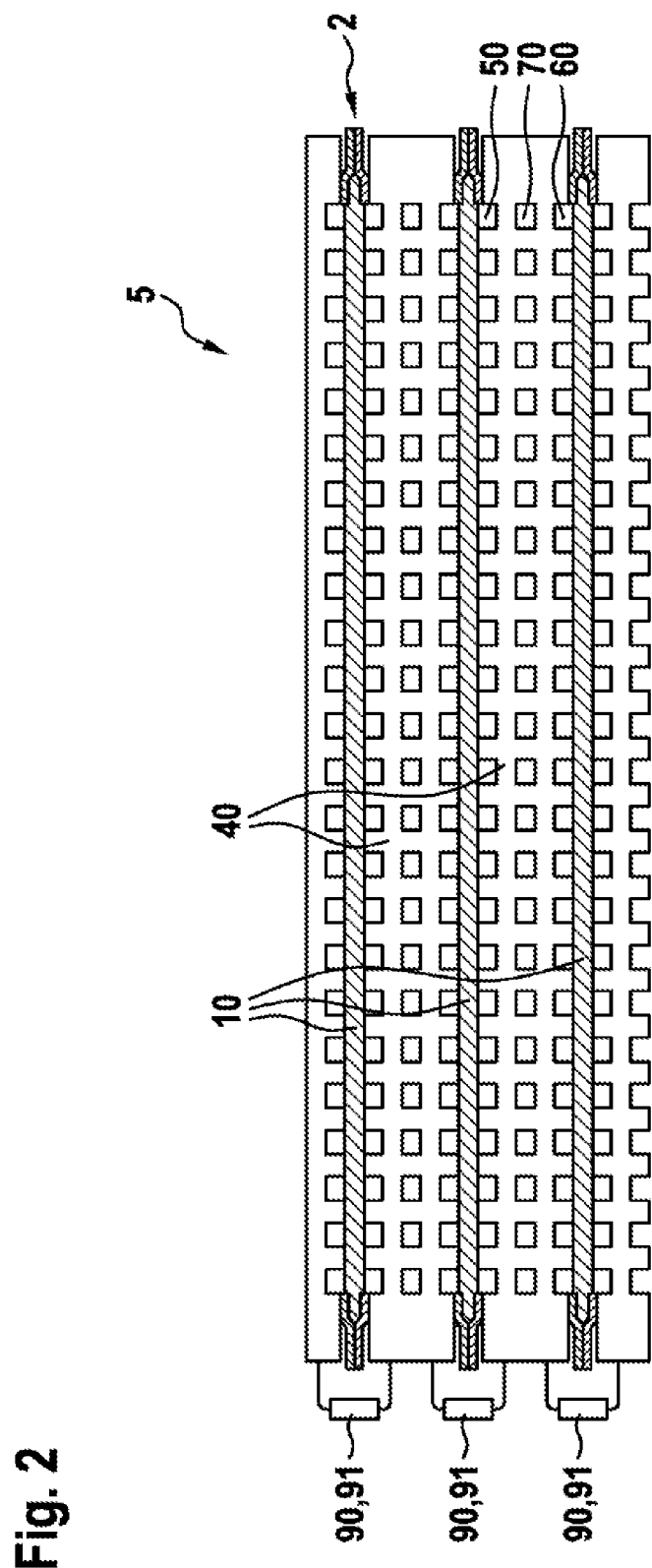
FIG. 2 shows a fuel cell stack according to a first embodiment.

FIG. 2 shows a fuel cell stack 5 according to a first embodiment. Between each pair of adjacent bipolar plates 40 is connected a conductor 90 in the form of a discrete component 91. The conductor 90 thus constitutes an electrical connection between two adjacent bipolar plates 40. Thus also the anode 21 and the cathode 22 of the membrane/electrode unit 10 that is arranged between the adjacent bipolar plates 40 are electrically connected by means of the conductor 90. The conductor 90 can be embodied as an ohmic resistor or as a semiconductor member, in particular as a Zener diode. The conductor 90 can also comprise a plurality of members, for instance a series connection or parallel connection of an ohmic resistor and a semiconductor member.

Figure 3:
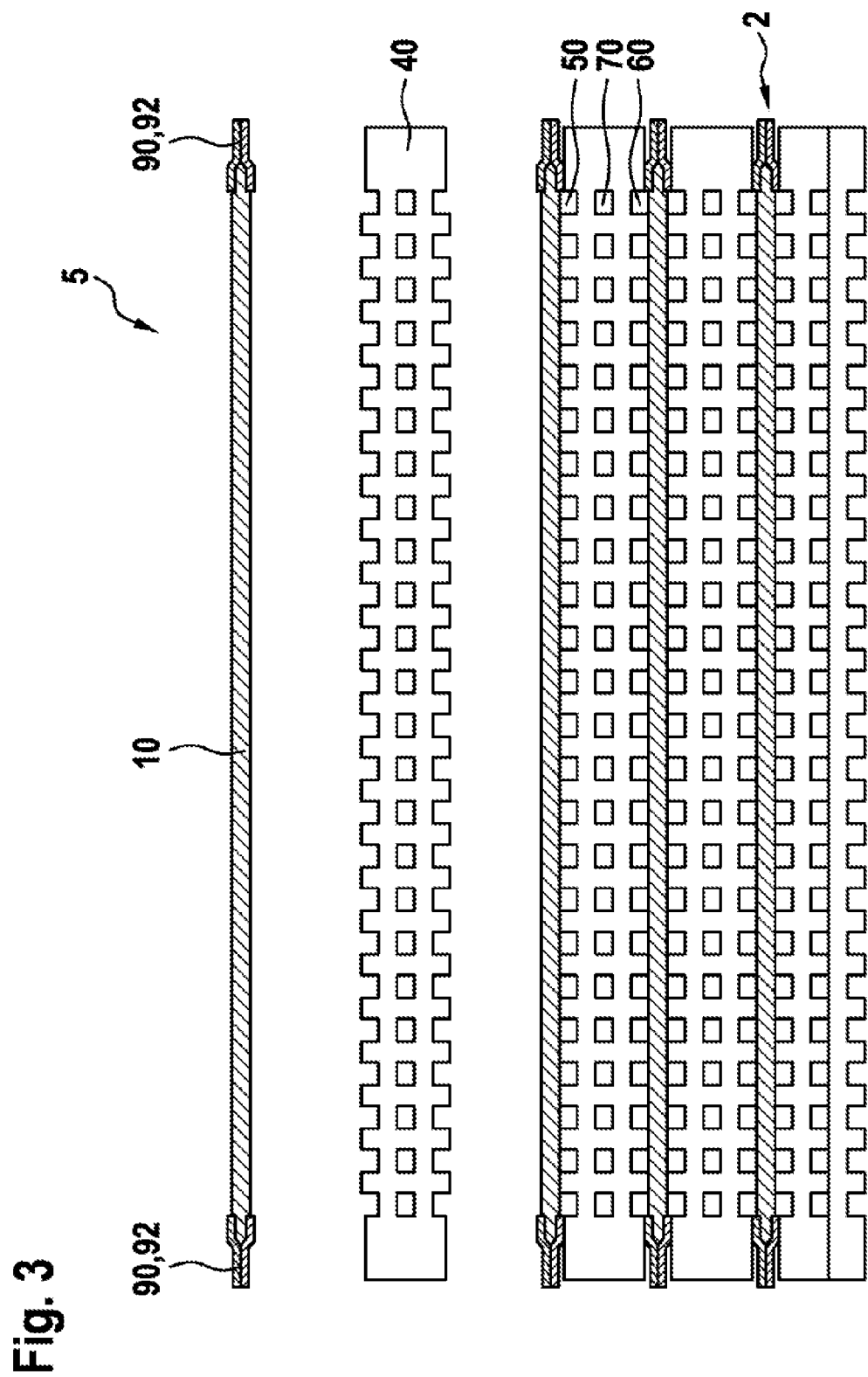
FIG. 3 shows a fuel cell stack according to a second embodiment in a partially exploded view.

FIG. 3 shows a fuel cell stack 5 according to a second embodiment in a partially exploded view. Each of the membrane/electrode units 10 comprises a reinforcing member 92 at each opposite edge region. The reinforcing member 92 may also run all the way round. The reinforcing member 92 here consists of two foil-like members that are connected to each other and hold the anode 11, the membrane 18, and the cathode 22 of the membrane/electrode unit 10 together mechanically, and/or serve to make the membrane/electrode unit 10 less sensitive to compressive forces arising during the assembly. The reinforcing member 92 is electrically conductive and has a defined ohmic resistance. The reinforcing member 92 is in contact with the adjacent bipolar plates 40 and thus constitutes an electrical connection between each pair of adjacent bipolar plates 40. Therefore the reinforcing member 92 defines a conductor 90. Thus also the anode 21 and the cathode 22 of the membrane/electrode unit 10 arranged between the adjacent bipolar plates 40 are electrically connected by means of the conductor 90.

Figure 4:
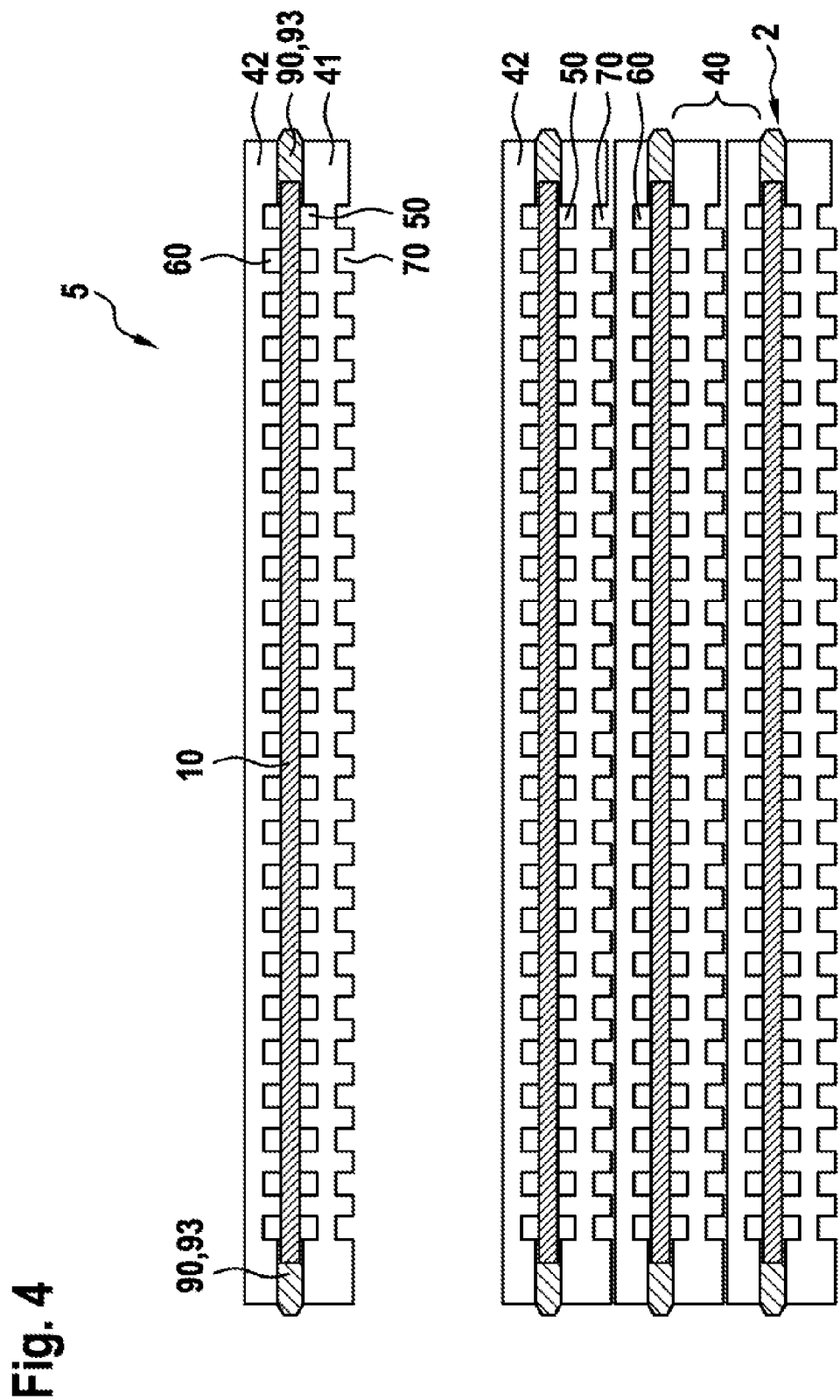
FIG. 4 shows a fuel cell stack according to a third embodiment in a partially exploded view.

FIG. 4 shows a fuel cell stack 5 according to a third embodiment in a partially exploded view. Each of the membrane/electrode units 10 comprises a sealing member 93 at each opposite edge region. The sealing member 93 is in contact with the adjacent bipolar plates 40 and seals the edge region of the membrane/electrode unit 10 against the adjacent bipolar plates 40. The sealing member 93 is electrically conductive and has a defined ohmic resistance. The sealing member 93 thus constitutes an electrical connection between each pair of adjacent bipolar plates 40. Therefore the sealing member 93 defines a conductor 90. Thus also the anode 21 and the cathode 22 of the membrane/electrode unit 10 arranged between the adjacent bipolar plates 40 are electrically connected by means of the conductor 90.

In the fuel cell stack 5 according to the third embodiment, each membrane/electrode unit 10 is arranged, in particular enclosed, between a first sub-plate 41 and a second sub-plate 42. The first sub-plate 41 here comprises the first distribution region 50 and the third distribution region 70, and the second sub-plate comprises the second distribution region 60. It is also conceivable that the first sub-plate 41 comprises only the first distribution region 50, and the second sub-plate 42 comprises the second distribution region 60 and the third distribution region 70. In the fuel cell stack 5, a first sub-plate 41 then forms with an adjacent second sub-plate 42 a bipolar plate 40. The sub-plates 41 and 42 can be mechanically connected for this purpose or else just stacked one against the other.

Figure 5:
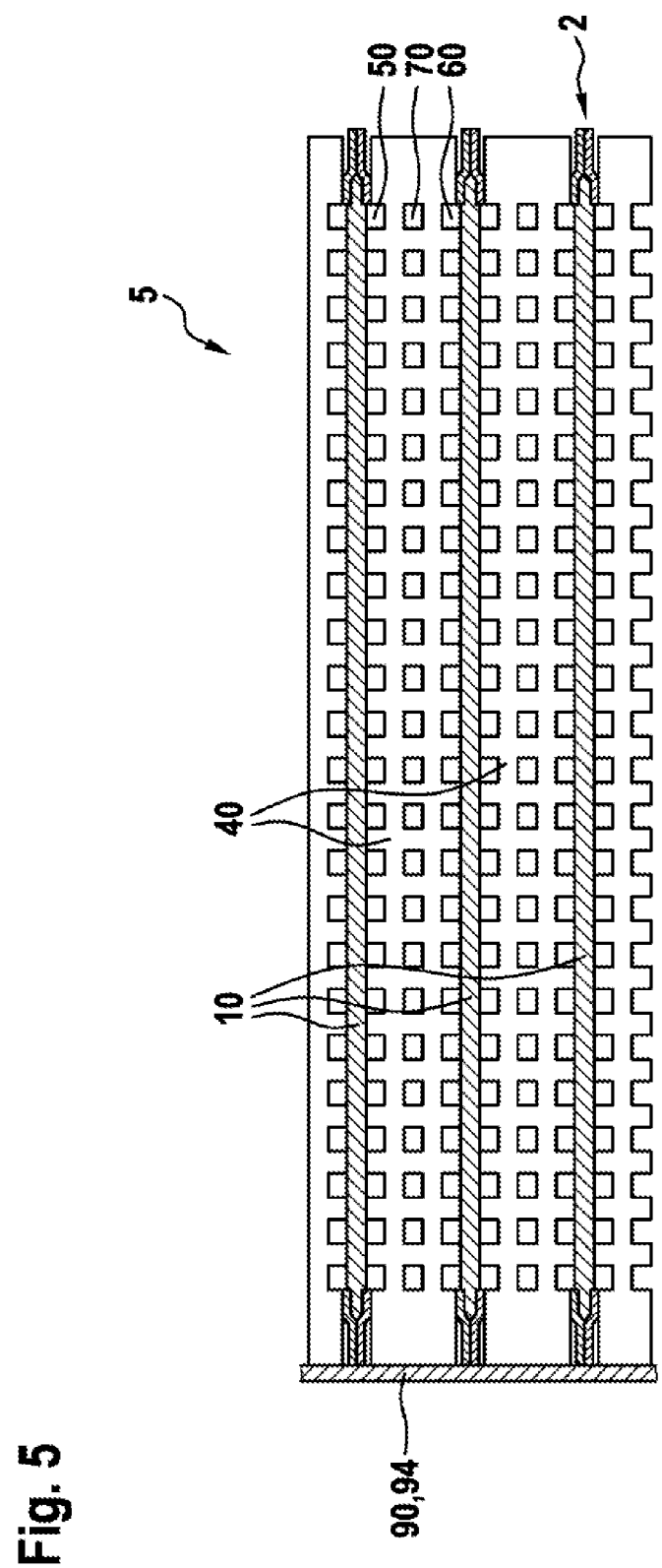
FIG. 5 shows a fuel cell stack according to a fourth embodiment.

FIG. 5 shows a fuel cell stack 5 according to a fourth embodiment. Edge regions of the membrane/electrode unit 10 and end faces of the bipolar plates 40 are enclosed by a potting compound 94. The potting compound 94 hence is in contact in particular with end faces of adjacent bipolar plates 40. The potting compound 94 is electrically conductive and has a defined ohmic resistance. The potting compound 94 thus constitutes an electrical connection between each pair of adjacent bipolar plates 40. Therefore the potting compound 94 defines a conductor 90. Thus also the anode 21 and the cathode 22 of the membrane/electrode unit 10 arranged between the adjacent bipolar plates 40 are electrically connected by means of the conductor 90.

Figure 6:
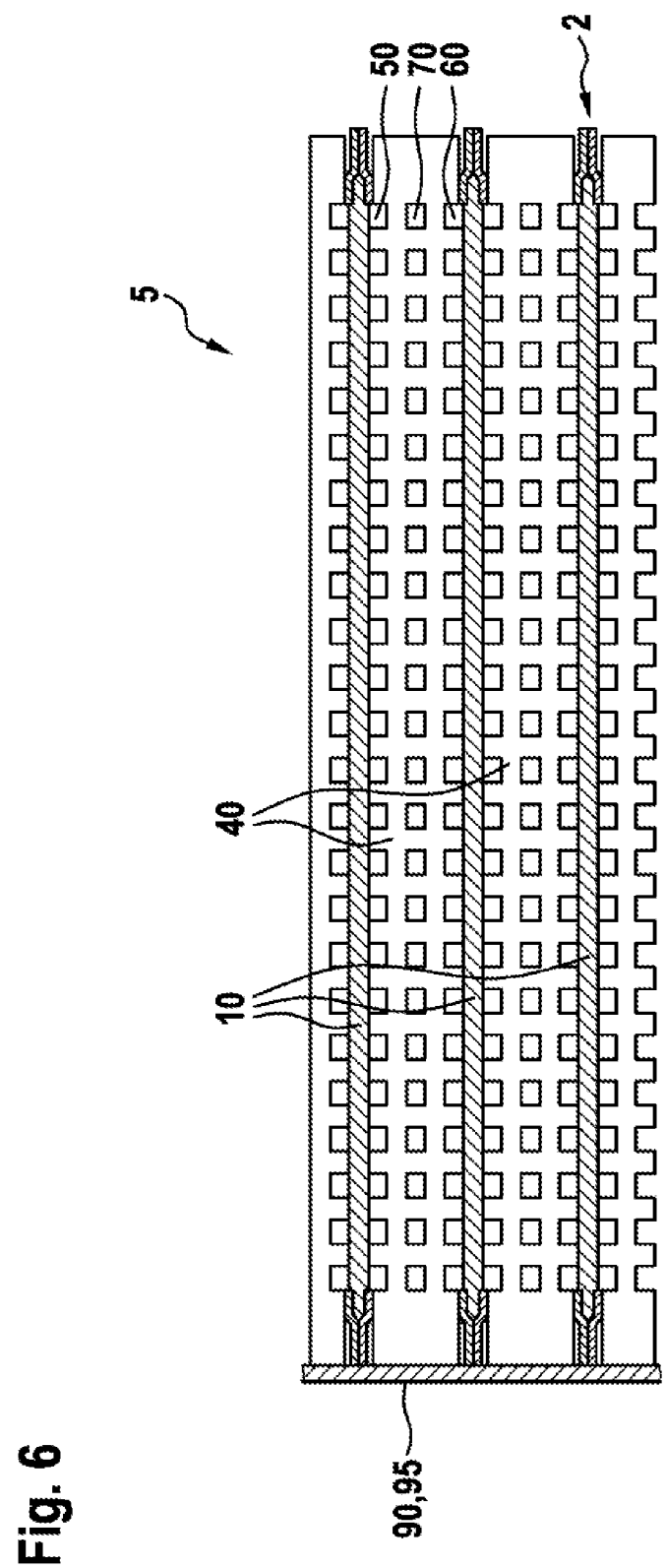
FIG. 6 shows a fuel cell stack according to a fifth embodiment.

FIG. 6 shows a fuel cell stack 5 according to a fifth embodiment. Edge regions of the membrane/electrode unit 10 and end faces of the bipolar plates 40 are covered by a film 95. The film 95 hence is in contact in particular with end faces of adjacent bipolar plates 40. The film 95 is made of a doped semiconductor material. The film 95 becomes conductive, for example, when an applied voltage exceeds a threshold value. Thus the film 95 constitutes an electrical connection between each pair of adjacent bipolar plates 40. Therefore the film 95 defines a conductor 90. Thus also the anode 21 and the cathode 22 of the membrane/electrode unit 10 arranged between the adjacent bipolar plates 40 are electrically connected by means of the conductor 90.

The invention is not limited to the exemplary embodiments described here nor to the aspects highlighted therein. Indeed within the area defined by the claims, numerous variations are possible that lie within the scope of persons skilled in the art.

The invention claimed is:

1. A fuel cell (2) comprising:
   at least one membrane/electrode unit (10), which has a first electrode (21) and a second electrode (22) separated from one another by a membrane (18), and
   at least one polar plate (40), which includes a first distribution region (50) for distributing a fuel to the first electrode (21), and/or a second distribution region (60) for distributing an oxidizing agent to the second electrode (22), wherein the first electrode (21) and the second electrode (22) of the at least one membrane/electrode unit (10) are electrically connected by means of a conductor (90), and wherein the conductor (90) includes a reinforcing member (92), which is arranged at an edge region of the at least one membrane/electrode unit (10) and which holds the first electrode (21), the second electrode (22) and the membrane (18) together mechanically, wherein the reinforcing member (92) includes two foil-like members on each side of the at least one membrane/electrode unit (10), and wherein the foil-like members are connected to each other outside of the edge region of the at least one membrane/electrode unit (10).

2. The fuel cell (2) as claimed in claim 1, characterized in that the conductor (90) further comprises an ohmic resistor.

3. The fuel cell (2) as claimed in claim 1, characterized in that the conductor (90) comprises a semiconductor member.

4. A fuel cell stack (5) comprising a plurality of fuel cells (2) according to claim 1.

5. The fuel cell (2) as claimed in claim 1, wherein the at least one polar plate (40) includes the first distribution region (50) for distributing a fuel to the first electrode (21).

6. The fuel cell (2) as claimed in claim 5, wherein the at least one polar plate (40) also includes the second distribution region (60) for distributing an oxidizing agent to the second electrode (22).

7. The fuel cell (2) as claimed in claim 1, wherein the at least one polar plate (40) includes the second distribution region (60) for distributing an oxidizing agent to the second electrode (22).

8. The fuel cell (2) as claimed in claim 1, wherein an adhesive adhesively bonds the reinforcing member (92) to the polar plate and to the membrane/electrode unit (10).

9. A fuel cell (2) comprising:

at least one membrane/electrode unit (10), which has a first electrode (21) and a second electrode (22) separated from one another by a membrane (18), and at least one polar plate (40), which includes a first distribution region (50) for distributing a fuel to the first electrode (21), and/or a second distribution region (60) for distributing an oxidizing agent to the second electrode (22), wherein the first electrode (21) and the second electrode (22) of the at least one membrane/electrode unit (10) are electrically connected by means of a conductor (90), and wherein the conductor (90) is an adhesive.

10. A fuel cell (2) comprising:

at least one membrane/electrode unit (10), which has a first electrode (21) and a second electrode (22) separated from one another by a membrane (18), and at least one polar plate (40), which includes a first distribution region (50) for distributing a fuel to the first electrode (21), and/or a second distribution region (60) for distributing an oxidizing agent to the second electrode (22), wherein the first electrode (21) and the second electrode (22) of the at least one membrane/electrode unit (10) are electrically connected by means of a conductor (90), wherein the conductor (90) is embodied as a potting compound (94), which encloses an edge region of the at least one membrane/electrode unit (10) and an end face of the at least one polar plate (40).

\* \* \* \* \*